United States Patent [19]
Yamada et al.

[11] Patent Number: 5,341,450
[45] Date of Patent: Aug. 23, 1994

[54] LINBO3 THIN FILM OPTICAL WAVEGUIDE DEVICE AND PROCESS FOR PRODUCING THE SAME

[75] Inventors: Atsuo Yamada, Kanagawa; Hitoshi Tamada, Tokyo; Masaki Saitoh, Kanagawa, all of Japan

[73] Assignee: Sony Corporation, Tokyo, Japan

[21] Appl. No.: 861,135

[22] Filed: Mar. 31, 1992

[30] Foreign Application Priority Data

Mar. 27, 1991 [JP] Japan .................... 3-063469
Mar. 28, 1991 [JP] Japan .................... 3-064674
Feb. 10, 1992 [JP] Japan .................... 3-023980

[51] Int. Cl.$^5$ .................................. G02B 6/00
[52] U.S. Cl. ...................... 385/130; 385/129; 385/131
[58] Field of Search ................ 385/129, 130, 131, 141

Primary Examiner—Rodney B. Bovernick
Assistant Examiner—Stephen W. Barns
Attorney, Agent, or Firm—Hill, Steadman & Simpson

[57] ABSTRACT

Disclosed herein is an optical waveguide device of $LiNbO_3$ which guides efficiently both or either of ordinary ray and extraordinary ray of visible light in the short wavelength region. It is prepared by forming an $LiNbO_3$ thin film optical waveguide on an $LiNbO_3$ substrate undoped or doped with MgO, with or without a base layer interposed between them, by liquid phase epitaxy which employs $Li_2O$-$B_2O_3$ as the flux.

5 Claims, 6 Drawing Sheets

LINBO3 THIN FILM OPTICAL WAVEGUIDE DEVICE AND PROCESS FOR PRODUCING THE SAME

BACKGROUND OF THE INVENTION

1. Field of the Invention

The present invention relates to an $LiNbO_3$ thin film optical waveguide device and a process for producing the same. The device exhibits the waveguide function for ordinary ray only or for extraordinary ray only or for the light including extraordinary ray. Moreover, it absorbs short wavelength light (e.g. blue light) only a little.

2. Description of the Prior Art

There are available a variety of modern functional optical waveguide devices such as optical deflectors, optical modulators, and optical switches, which are based on $LiNbO_3$ crystal because of its outstanding electro-optical constant and nonlinear optical constant.

The optical waveguide of $LiNbO_3$ is usually formed by the metal diffusion process (which involves the step of selectively diffusing a metal such as titanium into the part where the optical waveguide is formed) or by the ion exchange (proton exchange) process.

The foregoing first process has a disadvantage that the resulting optical waveguide is liable to optical damage on account of the introduction of impurities such as titanium. In other words, a titanium-containing optical waveguide changes in refractive index (and hence becomes poor in characteristic properties) when it encounters a beam of intense light. Since the optical damage is more serious as the wavelength is shorter, it cannot be used for blue light in the visible region.

The foregoing second process also has a disadvantage of deteriorating the characteristic properties (e.g., electro-optical constant and nonlinear optical constant) of $LiNbO_3$. Moreover, its application is limited to an optical waveguide which is effective only for extraordinary ray.

The above-mentioned two processes, both of which are based on diffusion, do not permit one to independently select the width and depth of the waveguide and the distribution of refractive indices in the waveguide. This leads to a problem associated with difficulties in controlling the dimensions and shape and also in creating the stepwise distribution of refractive indices.

A conceivable way to address the foregoing problems is to form the optical waveguide by liquid phase epitaxy. With liquid phase epitaxy, it would be possible to control the depth with certainty and to create the sharp stepwise distribution of refractive indices.

There has been proposed a process for liquid phase epitaxy that employs a substrate of $LiTaO_3$ and grows $LiNbO_3$ on it from the molten solution containing $Li_2O-V_2O_5$ as the flux. This liquid phase epitaxy has a disadvantage that the resulting $LiNbO_3$ waveguide is poor in film quality and absorbs more light in the short wavelength region (blue light).

The present inventors investigated the reason why the $LiNbO_3$ thin film formed by liquid phase epitaxy absorbs short wavelength light. It was found that the light absorption is due to the entrance of a vanadium atom into the Nb site in the crystal of $LiNbO_3$ thin film. In this situation, the vanadium ion has the d electron (in the outer shell electron orbital) whose level is split by the crystal field, and transition from one level to another is the cause of light absorption in a specific wavelength region where light absorption should not occur naturally.

Meanwhile, U.S. Pat. No. 3,998,687 discloses a process for the liquid phase epitaxy of $LiNbO_3$ from a molten solution of $Li_2B_2O_4-Li_2Nb_2O_6$. This process is intended to grow $LiNbO_3$ on an $LiTaO_3$ substrate by liquid phase epitaxy. The resulting $LiNbO_3$ does not selectively guide ordinary light only.

SUMMARY OF THE INVENTION

It is an abject of the present invention to provide an improved $LiNbO_3$ thin film optical waveguide device which absorbs a less amount of light in the short wavelength region.

It is another object of the present invention to provide an optical waveguide device which selectively guides ordinary ray almost entirely but guides extraordinary ray very little.

It is further another object of the present invention to provide an optical waveguide device of $LiNbO_3$ thin film formed on an $LiNbO_3$ substrate. It also guides extraordinary ray owing to its outstanding crystallinity and optical characteristics.

According to the present invention, the $LiNbO_3$ thin film optical waveguide device was completed on the basis of the following findings.

The $LiNbO_3$ thin film crystal has some Nb sites that permit the entrance of vanadium atoms. The resulting vanadium ion has the d electron (in the outer shell electron orbital) whose level is split by the crystal field, and transition from one level to another brings about the light absorption in a specific wavelength region where light absorption should not occur naturally.

The more $LiNbO_3$ is doped with MgO, the smaller its refractive indices $n_o$ and $n_e$ are for ordinary ray and extraordinary ray, respectively.

The $LiNbO_3$ thin film grown by liquid phase epitaxy on an MgO-doped $LiNbO_3$ substrate is superior in quality (such as crystallinity) to that grown on an undoped $LiNbO_3$ substrate.

The $LimbO_3$ thin film does not change in the refractive index $n_o$ for ordinary ray even when it varies in the atomic ratio Li/Nb, whereas it increases in the refractive index $n_e$ for extraordinary ray from its minimum value at the stoichiometric ratio $Li/Nb \approx 1$ as its Li content decreases.

Figure 1:
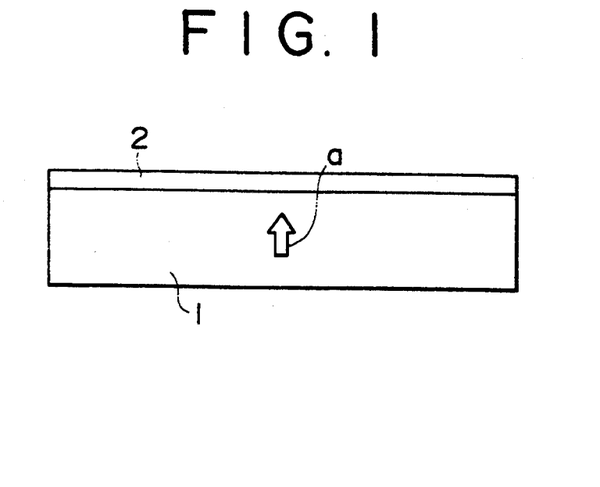
FIG. 1 is a schematic sectional view showing an embodiment of the LiNbO$_3$ thin film optical waveguide device pertaining to the present invention.

The first aspect of the present invention resides in an $LiNbO_3$ thin film optical waveguide device which comprises an MgO-doped $LiNbO_3$ substrate 1 and a waveguide 2 of thin film epitaxially grown on said substrate from $LiNbO_3$ which is free from impurity atoms whose outer shell orbital susceptible to the crystal field are unfilled with electrons, as shown in FIG. 1 which is a schematic sectional view.

The second aspect of the present invention resides in a method for producing an $LiNbO_3$ thin film optical waveguide device, said method comprising forming on an MgO-doped $LiNbO_3$ substrate 1 a thin film optical waveguide 2 of $LiNbO_3$ by liquid phase epitaxy which employs $Li_2O-B_2O_3$ as the flux.

Figure 2:
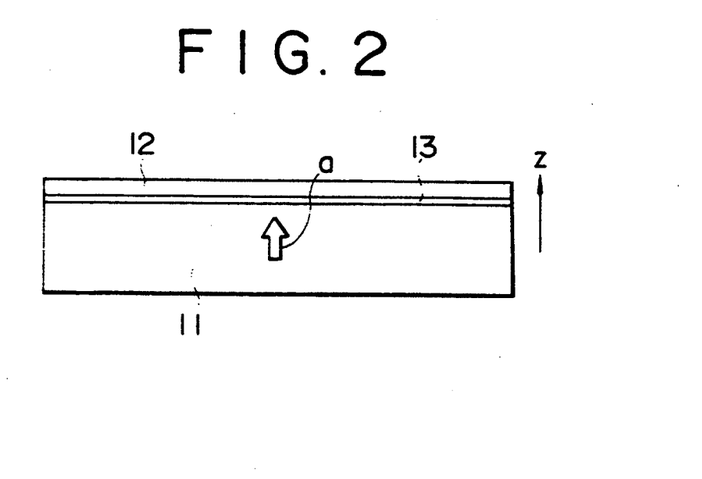
FIG. 2 is a schematic sectional view showing an embodiment of the LiNbO$_3$ thin film optical waveguide device pertaining to the present invention.

The third aspect of the present invention resides in an $LiNbO_3$ thin film optical waveguide device which comprises a substrate 11 of $LiNbO_3$ which is undoped or doped with MgO or ZnO (similar to MgO in properties), a base layer 13 of $LiNbO_3$, and a thin film optical waveguide 12 of $LiNbO_3$, said base layer 13 being richer in Li than the thin film optical waveguide 12, as shown in FIG. 2 which is a schematic sectional view.

Figure 3:
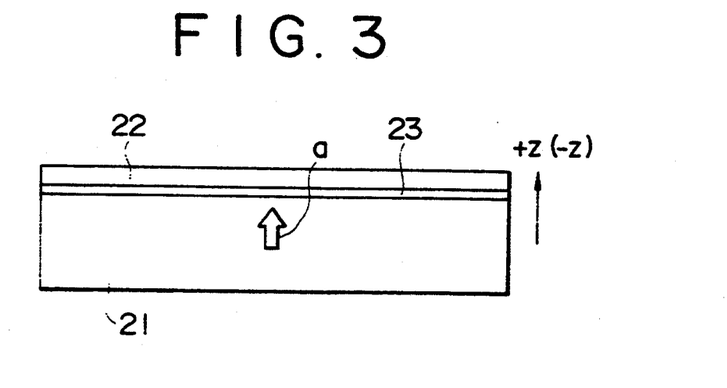
FIG. 3 is a schematic sectional view showing an embodiment of the LiNbO$_3$ thin film optical waveguide device pertaining to the present invention.

The fourth aspect of the present invention resides in an LiNbO$_3$ thin film optical waveguide device which comprises a substrate 21 of LiNbO$_3$ which is undoped or doped with MgO or ZnO (similar to MgO in properties), an MgO-doped base layer 23 of LiNbO$_3$, and a thin film optical waveguide 22 of LiNbO$_3$ which is undoped or doped with MgO in an amount less than MgO in the base layer or with ZnO and hence has greater refractive indices $n_o$ and $n_e$ for ordinary ray and extraordinary ray, respectively, than the base layer 23, as shown in FIG. 3 which is a schematic sectional view.

DESCRIPTION OF THE PREFERRED EMBODIMENTS

According to the present invention, the LiNbO$_3$ thin film optical waveguide is designed to absorb a less amount of light in the short wavelength region. This object is achieved by using B$_2$O$_3$ in place of V$_2$O$_5$ as the flux for liquid phase epitaxy. In other words, the LiNbO$_3$ thin film crystal is free from an impurity that brings about light absorption. That is, vanadium ion has the d electron (in the outer shell electron orbital) whose level is split by the crystal field, and transition from one level to another is the cause of light absorption in a specific wavelength region where light absorption should not occur naturally. Moreover, B$_2$O$_3$ used as the flux does not readily enter LiNbO$_3$.

Figure 4:
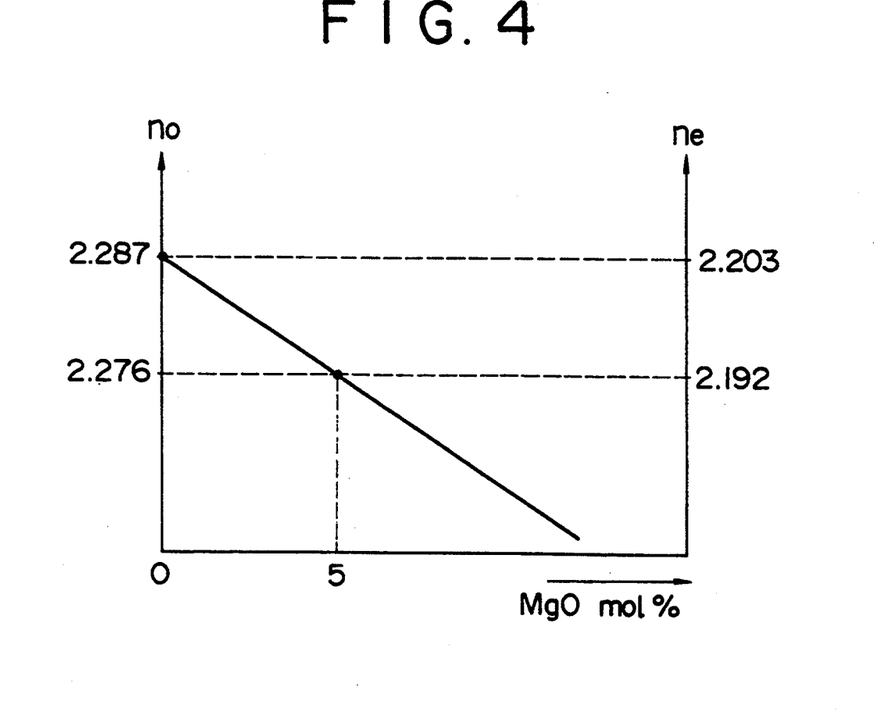
FIG. 4 is a diagrammatic representation showing the relationship between the amount of MgO doped and the refractive indices of $n_o$ and $n_e$.

According to the present invention, the LiNbO$_3$ optical waveguide has the refractive indices $n_o$ and $n_e$ for ordinary ray and extraordinary ray, respectively, both of which decrease with the increasing amount of MgO doped. FIG. 4 shows the dependence of the refractive indices $n_o$ and $n_e$ (at a wavelength $\lambda$ of 633 nm) on the amount of MgO doped, with the LiNbO$_3$ substrate 1 having the congruent composition.

Figure 5:
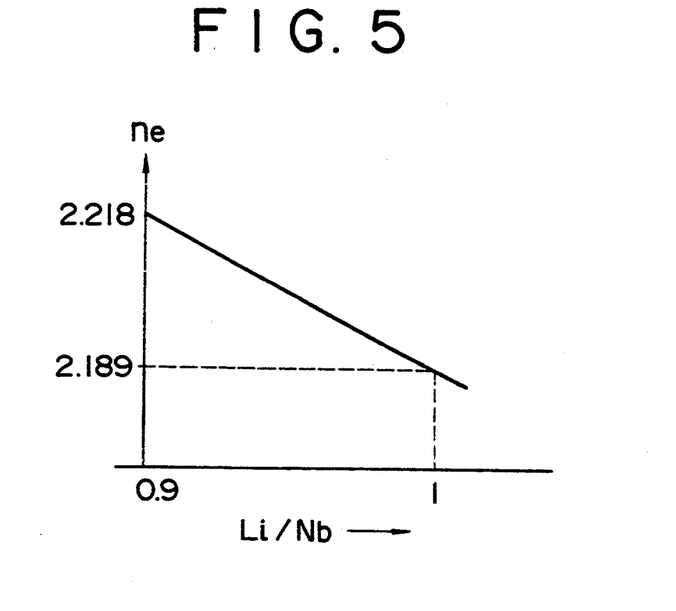
FIG. 5 is a diagrammatic representation showing the relationship between Li/Lb and the refractive index $n_e$.

According to the present invention, the LiNbO$_3$ optical waveguide has the refractive index $n_e$ for extraordinary ray which varies depending on the atomic ratio Li/Nb of Li and Nb constituting the LiNbO$_3$, whereas it also has the refractive index $n_o$ for ordinary ray which hardly depends on the atomic ratio Li/Nb. FIG. 5 shows the dependence of the refractive index $n_e$ for extraordinary ray (at a wavelength $\lambda$ of 633 nm) on the atomic ratio Li/Nb.

Assuming that the LiNbO$_3$ substrate 1 has refractive indices of $n_{os}$ and $n_{es}$ for ordinary ray and extraordinary ray, respectively, and the LiNbO$_3$ thin film formed by liquid phase epitaxy has refractive indices of $n_{o2}$ and $n_{e2}$ for ordinary ray and extraordinary ray, respectively, then $n_{o2} > n_{os}$ and $n_{e2} \approx n_{es}$ or $n_{e2} < n_{es}$, if proper selection is made of the amount of MgO to be doped into the LiNbO$_3$ substrate 1, the amount of MgO or ZnO to be doped into the LiNbO$_3$ thin film, and the Li/Nb atomic ratio. This makes it possible to produce the special LiNbO$_3$ thin film optical waveguide 2 which guides ordinary ray only.

The optical waveguide which guides ordinary ray only is less liable to optical damage.

The LiNbO$_3$ thin film 2 as the optical waveguide has a better quality when formed on the MgO-doped LiNbO$_3$ substrate 1 by liquid phase epitaxy than when formed on an undoped LiNbO$_3$ substrate by liquid phase epitaxy. This, combined with the liquid phase epitaxy that employs B$_2$O$_3$ as the flux, results in the optical waveguide device which absorbs a less amount of light in the short wavelength region.

The optical waveguide as shown in FIG. 2 is made up of an LiNbO$_3$ substrate 11, a base layer 13, and a thin film optical waveguide 12, with the base layer 13 being richer in Li than the thin film optical waveguide 12. Assuming that the thin film optical waveguide 12 has refractive indices of $n_{o2}$ and $n_{e2}$ for ordinary ray and extraordinary ray, respectively, and the basic layer 13 has refractive indices of $n_{o3}$ and $n_{e3}$ for ordinary ray and extraordinary ray, respectively, then $n_{e2} < n_{es}$, which permits the thin film optical waveguide 12 to guide at least extraordinary ray. In addition, assuming that the substrate 11 has a refractive index of $n_{os}$ for ordinary ray, then $n_{o2} > n_{o3}$ or $n_{o2} \approx n_{o3} > n_{os}$, if proper selection is made of the dopant MgO or ZnO for the base layer 13 and the substrate 11 in relation to the LiNbO$_3$ thin film optical waveguide 12. In this case, the guide of ordinary ray is also accomplished by the base layer 13 and the thin film optical waveguide 12.

According to the present invention, the LiNbO$_3$ thin film optical waveguide device may have the structure as shown in FIG. 3. It is composed of an LiNbO$_3$ substrate 21 which is undoped or doped with MgO or ZnO, an LiNbO$_3$ base layer 23 which is doped with MgO so that it has low refractive indices $n_{o3}$ and $n_{e3}$ for ordinary ray and extraordinary ray, respectively, and an LiNbO$_3$ thin film optical waveguide 22 which is undoped or doped with a less amount of MgO (than in the base layer 23) or doped with a proper amount of ZnO so that it has refractive indices $n_{o2}$ and $n_{e2}$ for ordinary ray and extraordinary ray, respectively, where $n_{o2} > n_{o3}$ and $n_{e2} > n_{e3}$, and it guides both ordinary ray and extraordinary ray.

In the case of the structure as shown in FIGS. 2 or 3, the LiNbO$_3$ thin film optical waveguide 12 (or 22) and the LiNbO$_3$ base layer 13 (or 23) are formed on top of the other by liquid phase epitaxy. This double-layer structure is advantageous over the single-layer structure in which the thin film optical waveguide 12 (or 22) is formed directly on the LiNbO$_3$ substrate 11 (or 21). In the former case, the thin film optical waveguide 12 (or 22) has much stabler crystallinity and hence has optically better properties. The structure shown in FIG. 2 or 3 provides the base layer 13 (or 23) and the thin film optical waveguide 12 (or 22), both having the outstanding properties, if the LiNbO$_3$ substrate is doped with MgO or ZnO.

EXAMPLES

The invention will be described with reference to the following examples.

An optical waveguide device which guides ordinary ray only is explained first. It is schematically shown in section in FIG. 1. There is shown an LiNbO$_3$ substrate 1 which is doped with MgO. On this substrate 1 is formed an LiNbO$_3$ thin film optical waveguide 2 (which is undoped or doped with a small amount of MgO or an adequate amount of ZnO) by liquid phase epitaxy from a molten solution in which the atomic ratio Li/Nb is higher than 0.985 (so that it has a refractive index $n_e$ smaller than that of the substrate 1) and lower than 1.04 (so that it has good crystallinity).

The amount of MgO to be doped into the substrate 1 should be 0.1 to 10 mol %. With an amount less than 0.1 mol %, MgO hardly produces the effect of lowering the refractive index. With an amount in excess of 10 mol %, MgO has an adverse effect on the crystallinity.

The liquid phase epitaxy for the LiNbO$_3$ thin film optical waveguide 2 employs Li$_2$O-B$_2$O$_3$ as the flux. The flux should be free from impurity atoms whose outer shell orbital susceptible to the crystal field in the LiNbO$_3$ thin film are unfilled with electrons.

Example 1

An LiNbO$_3$ substrate 1 is made ready. It is a Z substrate which is doped with 5 mol % MgO and has a single domain, with the spontaneous polarization in the direction indicated by the arrow a.

On the +Z surface of the Z substrate is formed an LiNbO$_3$ thin film optical waveguide 2 by liquid phase epitaxy from a molten solution which contains Li$_2$O-B$_2$O$_3$ as the flux.

If the amount of B$_2$O$_3$ in the flux is fixed at 40 mol %, the amount of Li$_2$O should be 45-52 mol % and the amount of Nb$_2$O$_5$ should be 15-8 mol %.

The thin film optical waveguide 2 in this example has a low absorption coefficient for the short wavelength light. The dependence of the light absorption coefficient α on the wavelength is shown in FIG. 6.

Figure 6:
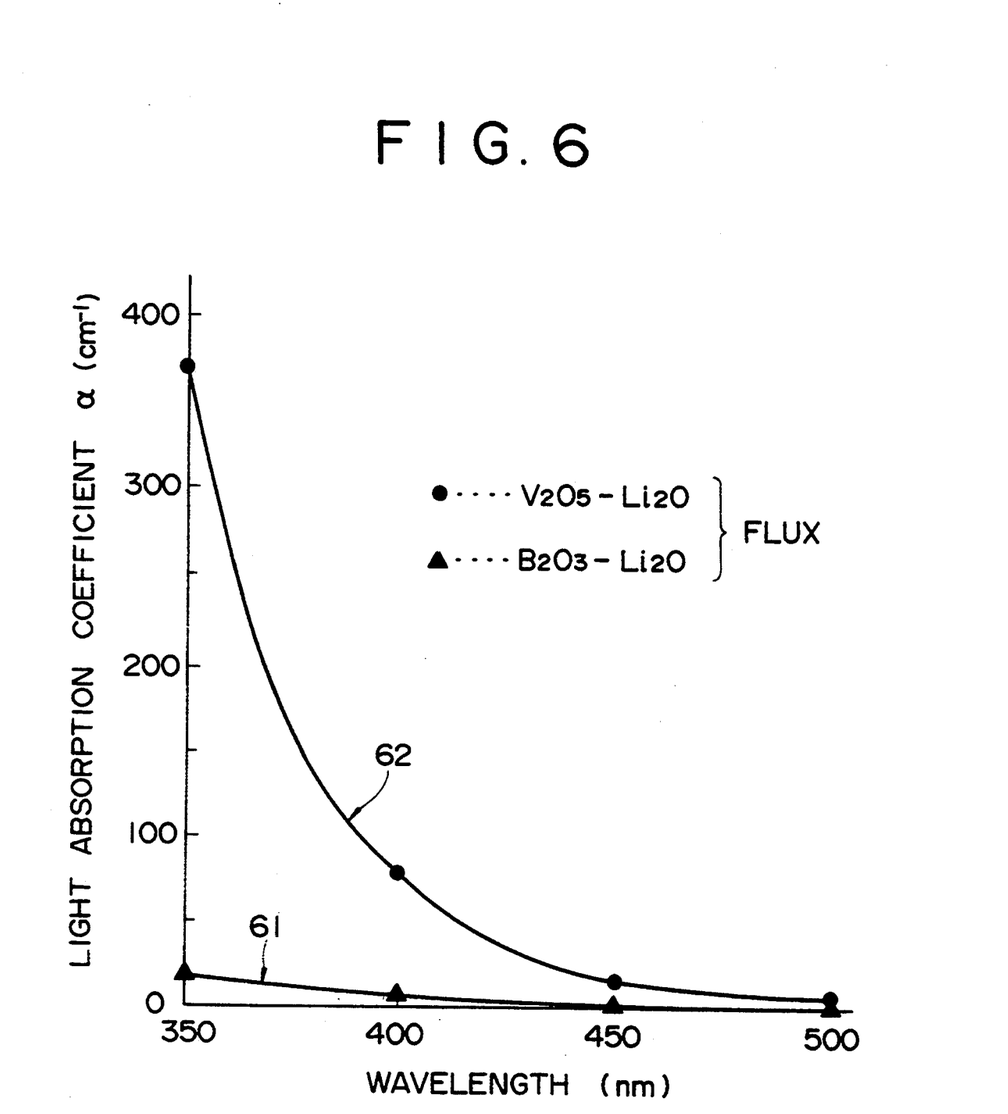
FIG. 6 is a graph showing the dependence of the light absorption coefficient on the wavelength.

The curve 61 in FIG. 6 represents the optical waveguide 2 formed by the liquid phase epitaxy which employs Li$_2$O-B$_2$O$_3$ as the flux according to Example 1, and the curve 62 in FIG. 6 represents the optical waveguide 2 formed by the liquid phase epitaxy which employs Li$_2$O-V$_2$O$_5$ as the flux according to the prior art technology.

In the case of the LiNbO$_3$ thin film 2 which is formed on the +Z surface of the LiNbO$_3$ substrate 1 by liquid phase epitaxy, as in Example 1, the spontaneous polarization occurs in the direction which coincides with that (indicated by the arrow a) of the LiNbO$_3$ substrate 1.

By contrast, in the case of the LiNbO$_3$ thin film which is formed on the −Z surface of the substrate 1, the spontaneous polarization occurs in the direction opposite to that of the substrate 1.

It is desirable, therefore, that the optical waveguide 2 be formed on the +Z surface in the production of a functional optical waveguide device.

The LiNbO$_3$ thin film formed by liquid phase epitaxy has the spontaneous polarization whose direction depends on the difference between the magnitudes of spontaneous polarization of the substrate 1 and the thin film 2. If the amount of Li$_2$O is less than 45 mol %, the polarization is unstable even on the +Z surface, with reversal noticed partly.

Figure 7:
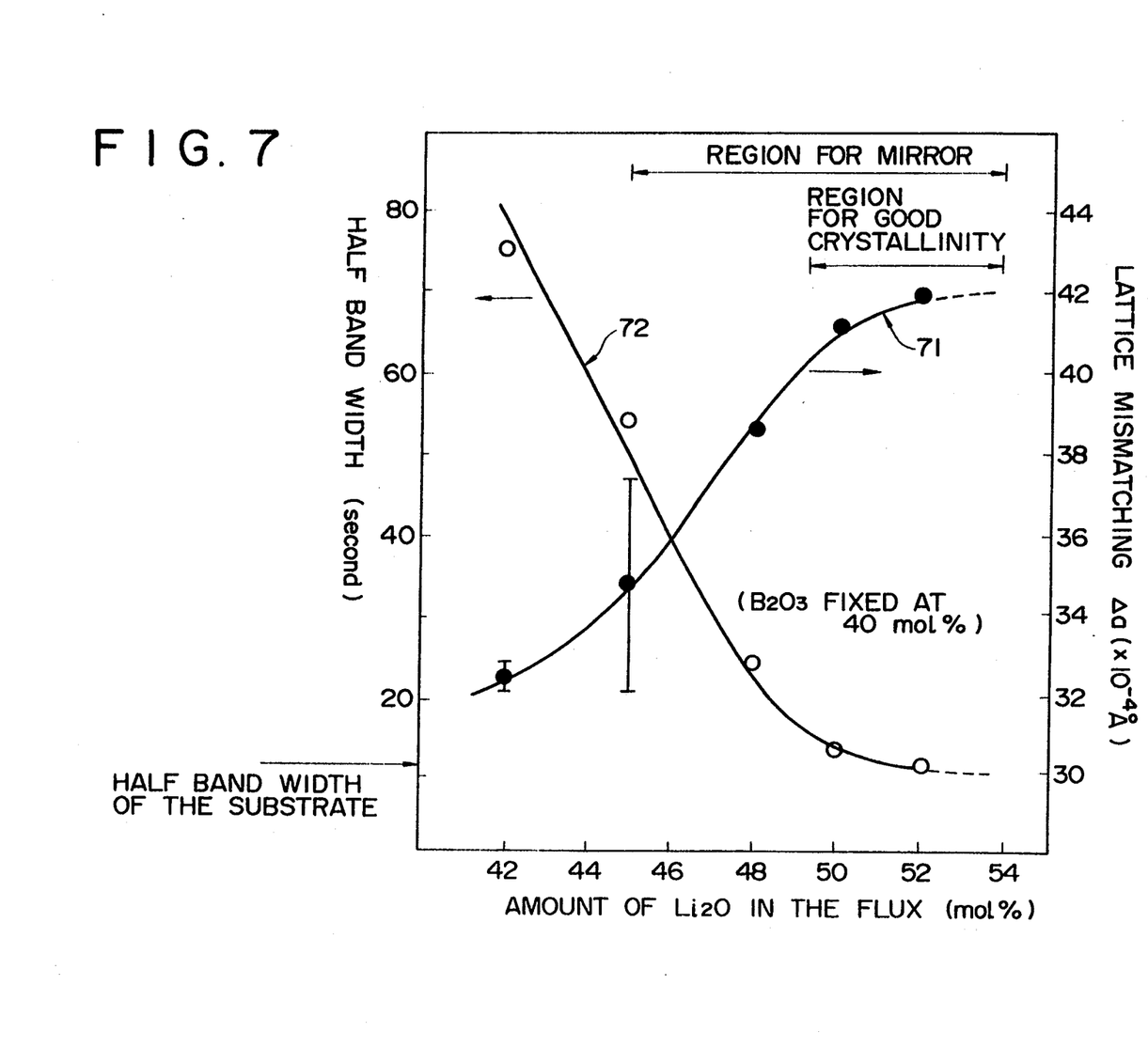
FIG. 7 is a graph showing the dependence of the lattice mismatching and X-ray half band width on the amount of Li$_2$O in the molten solution.

The thin film optical waveguide 2 has the lattice mismatching Δa and crystallinity which vary depending on the amount of Li$_2$O in the molten solution for liquid phase epitaxy, with the amount of B$_2$O$_3$ in the molten solution fixed at 40 mol %, as shown in FIG. 7. (The crystallinity is expressed in terms of half band width in X-ray diffractometry.)

In FIG. 7, the curve 71 represents the lattice mismatching Δa and the curve 72 represents the half band width in X-ray diffractometry. It is apparently noted that the lattice mismatching Δa increases with the increasing amount of Li$_2$O, whereas the X-ray half band width decreases (or the crystallinity improves) with the increasing amount of Li$_2$O. When the amount of Li$_2$O exceeds about 54 mol % epitaxy is unlikely to occur. This is indicated by the fact that there are regions in which the thin film exhibits the properties of a mirror and has the good crystallinity.

Figure 8:
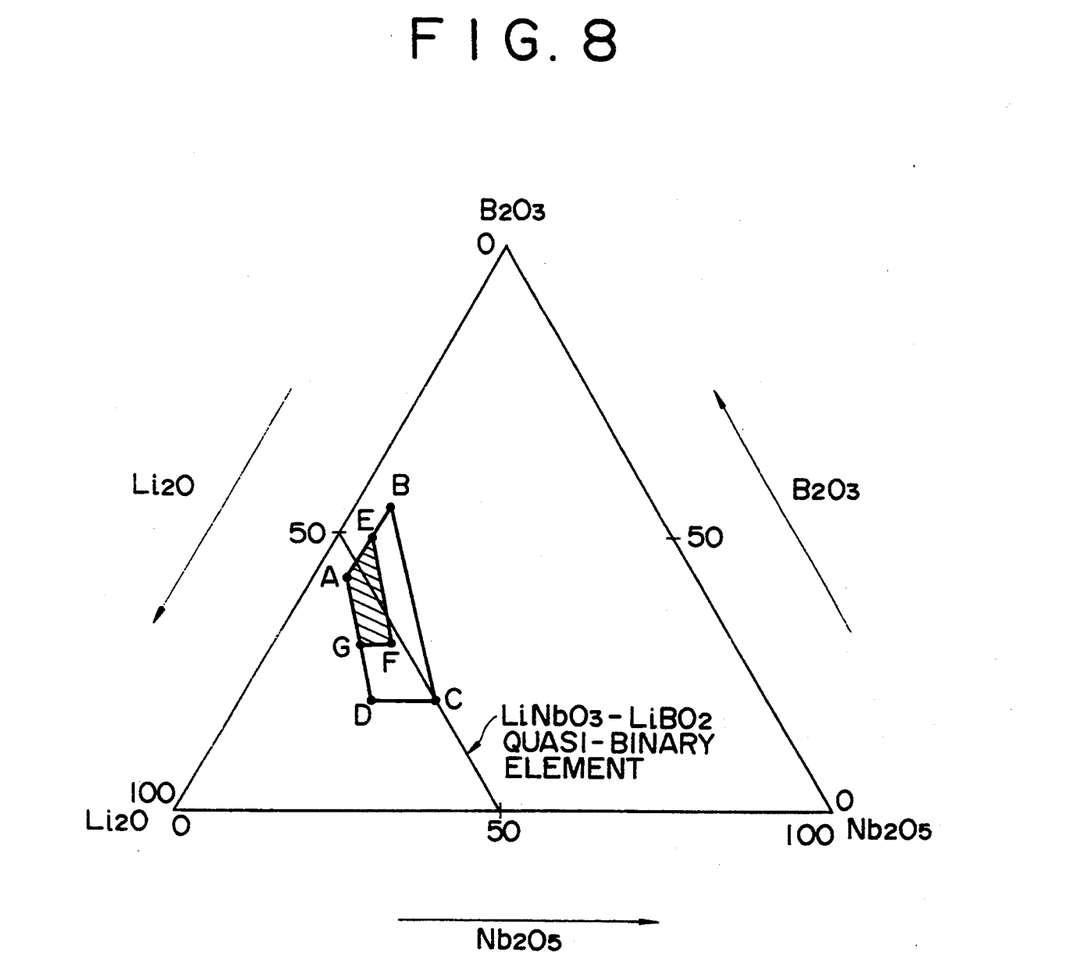
FIG. 8 is a ternary diagram showing the relationship between the crystallinity and the amounts of Li$_2$O, B$_2$O$_3$, and Nb$_2$O$_5$ in the molten solution.

The LiNbO$_3$ thin film formed by liquid phase epitaxy has the crystallinity which depends on the amounts of B$_2$O$_3$, Li$_2$O, and Nb$_2$O$_5$ in the molten solution, as shown in FIG. 8 (ternary diagram).

The area surrounded by lines passing through points A, B, C, and D is one in which the mirror-like LiNbO$_3$ thin film is obtained by liquid phase epitaxy. The area surrounded by lines passing through points A, E, F, and G is one in which the LiNbO$_3$ thin film having almost the same crystallinity as the substrate 1 is obtained.

The compositions at points A to G are shown in Table 1 below.

TABLE 1

| Point | Li$_2$O (mol %) | Nb$_2$O$_5$ (mol %) | B$_2$O$_3$ (mol %) |
| --- | --- | --- | --- |
| A | 53 | 5 | 42 |
| B | 40 | 5 | 55 |
| C | 50 | 30 | 20 |
| D | 60 | 20 | 20 |
| E | 46 | 5 | 49 |
| F | 52 | 18 | 30 |
| G | 57 | 13 | 30 |

This example may be modified such that the LiNbO$_3$ thin film optical waveguide is doped with MgO or ZnO in an amount much smaller than that of MgO doped into the substrate.

This example may also be modified such that the LiNbO$_3$ thin film optical waveguide 2 is formed by liquid phase epitaxy on the X surface or Y surface of the substrate 1 in place of Z surface of the substrate 1.

Another embodiment as shown in FIG. 2 is explained below. In this embodiment, the LiNbO$_3$ thin film optical waveguide 12 is formed on the substrate, with the LiNbO$_3$ base layer 13 interposed between them, so that the optical waveguide 12 guides extraordinary ray. The sample is prepared by forming on the LiNbO$_3$ substrate 11 the LiNbO$_3$ base layer 13 and the LiNbO$_3$ thin film optical waveguide 12 on top of the other. The LiNbO$_3$ base layer 13 contains more Li (or is richer in Li) than the LiNbO$_3$ thin film optical waveguide 12.

Example 2

An LiNbO$_3$ substrate 11 is made ready. It is a Z substrate which is doped with 5 mol % MgO and has a single domain, with the spontaneous polarization in the direction indicated by the arrow a.

On the +Z surface of the Z substrate are consecutively formed a base layer 13 and an LiNbO$_3$ thin film optical waveguide 12 by liquid phase epitaxy from a molten solution of Li$_2$O-B$_2$O$_3$-Nb$_2$O$_5$ which contains Li$_2$O-B$_2$O$_3$ as the flux, in the same manner as in Example 1.

The base layer 13 is formed such that it contains more Li than the thin film optical waveguide 12. Thus the base layer 13 has a refractive index n$_e$ for extraordinary ray which is smaller than that of the thin film optical waveguide 12.

Figure 9:
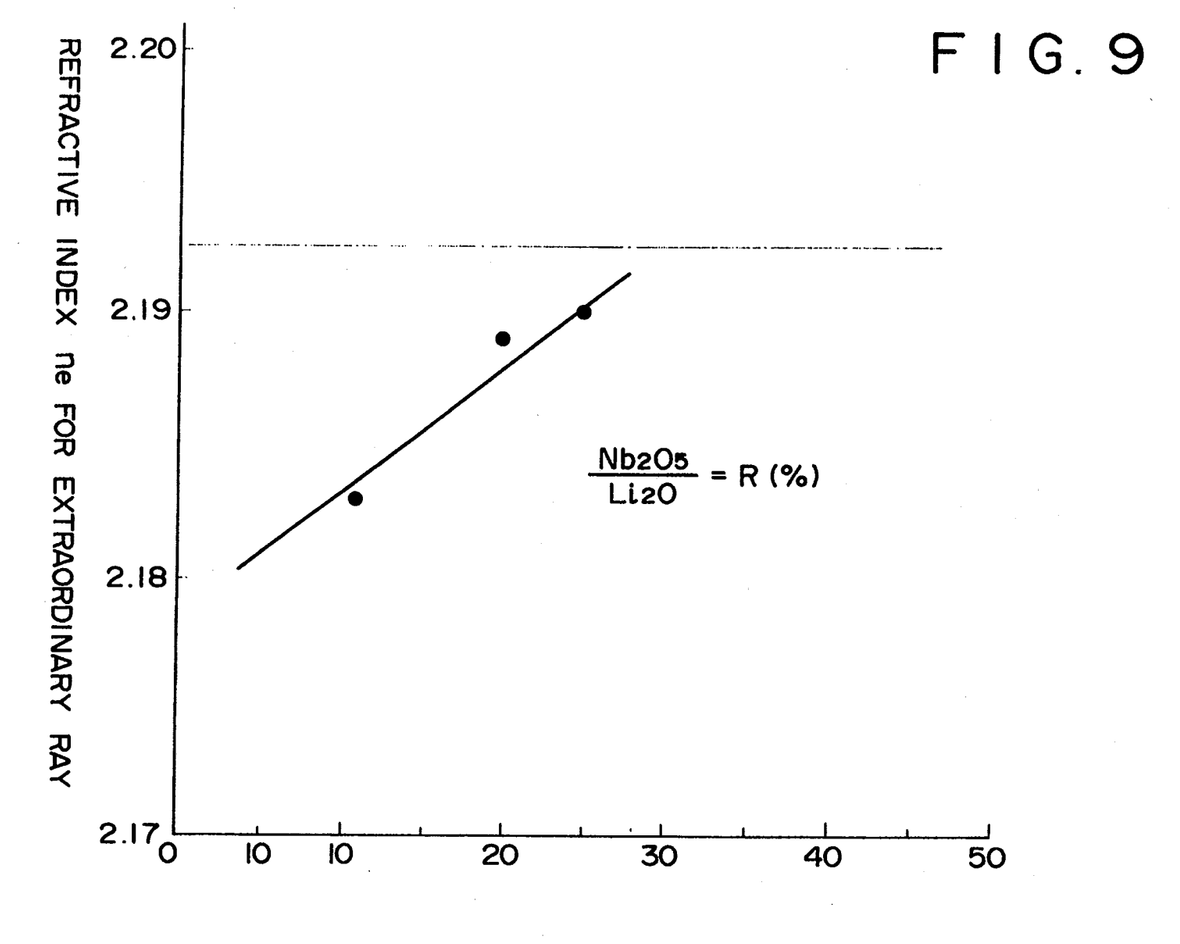
FIG. 9 is a diagrammatic representation showing the relationship between the refractive index $n_e$ and the composition of the molten solution.

The LiNbO$_3$ thin film has the refractive index n$_e$ for extraordinary ray (at a wavelength of 632.8 nm) which varies depending on the molar ratio (R %) of Nb$_2$O$_5$ to Li$_2$O in the molten solution, as shown in FIG. 9. The chain line in FIG. 9 denotes the n$_e$ of the LiNbO$_3$ substrate doped with 5 mol % of MgO.

It is noted from FIG. 9 that the refractive index n$_e$ for extraordinary ray (represented by the solid line) decreases with the increasing amount of Li, as in the case shown in FIG. 5.

The foregoing embodiment pertaining to the present invention is effective in guiding extraordinary ray because the Li-rich LiNbO$_3$ base layer 13 has a smaller refractive index for extraordinary ray than the LiNbO$_3$ thin film optical waveguide 12. In other words, extraordinary ray is effectively enclosed in the optical waveguide 12.

Since the LiNbO$_3$ thin film having good crystallinity is formed by liquid phase epitaxy when the ratio R of Nb$_2$O$_5$/Li$_2$O is about 30%, it is necessary that the content of Li in the base layer 13 be greater than that in the thin film optical waveguide 12 when the ratio R is 30% or less.

In this case, the thin film optical waveguide 12 will be effective in guiding both ordinary ray and extraordinary ray if the amount of MgO or ZnO to be doped is properly selected so that the thin film optical waveguide 12 has a greater refractive index for ordinary ray than the base layer 13.

Another embodiment which guides both ordinary ray and extraordinary ray is explained with reference to FIG. 3. There is shown an LiNbO$_3$ substrate 21 which is undoped or doped with MgO. On the substrate 21 are formed by liquid phase epitaxy a base layer 23 doped with MgO and an LiNbO$_3$ thin film optical waveguide 22 which is doped with a less amount of MgO than the base layer 23 or doped with a proper amount of ZnO so that its refractive indices n$_o$ and n$_e$ for ordinary ray and extraordinary ray, respectively, are greater than those of the base layer 23. An example for this embodiment is given below.

Example 3

An LiNbO$_3$ substrate 21 is made ready. It is a Z substrate which is doped with 5 mol % MgO and has a single domain, with the spontaneous polarization in the direction indicated by the arrow a. On the substrate are consecutively formed a base layer 23 and an LiNbO$_3$ thin film optical waveguide 22 by liquid phase epitaxy from a molten solution of Li$_2$O-B$_2$O$_3$-Nb$_2$O$_5$ which contains Li$_2$O-B$_2$O$_3$ as the flux, in the same manner as in Example 1. The LiNbO$_3$ base layer 23 and the LiNbO$_3$ thin film optical waveguide 22 may have the stoichiometric composition (i.e., Li/Nb $\approx$ 1), and in this case the LiNbO$_3$ base layer alone is doped with MgO.

An advantage of this embodiment is that the LiNbO$_3$ base layer 23 and the LiNbO$_3$ thin film optical waveguide 22 have good crystallinity and film properties when both of them have the stoichiometric composition.

As mentioned above, the present invention produces the following outstanding effects. According to the present invention, the liquid phase epitaxy employs Li$_2$O-B$_2$O$_3$ as the flux. In other words, the flux contains B in which the outer shell orbital susceptible to the crystal field is filled with electrons. Therefore, the epitaxially grown LiNbO$_3$ thin film is free from the d electron whose energy level is split by the influence of the anisotropic crystal field. For this reason, the LiNbO$_3$ does not absorb other light than that which it should absorb intrinsically. This ensures the effective guiding of light in the short wavelength region.

Thus the optical waveguide device of the present invention will find use as an optical switch, optical deflector, and optical modulator, which need to handle short wavelength light in the field of optical recording and retrieval.

In addition, the optical waveguide device of the present invention may be constructed such that it guides ordinary ray only or extraordinary ray only. This feature is advantageously applied to an optical device which is used in the field where it is desirable to avoid the entrance of ordinary ray or extraordinary ray.

Moreover, the optical waveguide device of the present invention may be constructed such that it guides both ordinary ray and extraordinary ray according to the object of use and the way in which it is used. Thus the present invention is of great practical use.

What is claimed is:

1. An LiNbO$_3$ thin film optical waveguide device which comprises an MgO-doped LiNbO$_3$ substrate and a waveguide of thin film epitaxially grown on said substrate from LiNbO$_3$ which is free from impurity atoms and which acts as an optical absorption center.

2. A method for producing an LiNbO$_3$ thin film optical waveguide device, said method comprising forming on an MgO-doped LiNbO$_3$ substrate a thin film optical waveguide of LiNbO$_3$ by liquid phase epitaxy which employs Li$_2$O-B$_2$O$_3$ as the flux.

3. An LiNbO$_3$ thin film optical waveguide device which comprises a substrate of LiNbO$_3$, and a base layer of (Li$_{x1}$Nb$_{y1}$ z$_1$)NbO$_3$ and a thin film optical waveguide of (Li$_{x2}$Nb$_{y2}$ z$_2$)NbO$_3$ formed on said substrate, where is a vacancy, $x_1+y_1+z_1=1$, $x_2+Y_2+z_2=1$, and $x_1>x_2$.

4. An LiNbO$_3$ thin film optical waveguide device which comprises a substrate of LiNbO$_3$, and an MgO-doped base layer of LiNbO$_3$ and a thin film optical waveguide of LiNbO$_3$ formed on said substrate, said thin film optical waveguide being undoped.

5. An LiNbO$_3$ thin film optical waveguide device which comprises a substrate of LiNbO$_3$, and an MgO-doped base layer of LiNbO$_3$ and a thin film optical waveguide of LiNbO$_3$ formed on said substrate, said thin film optical waveguide being doped with one member selected from MgO in an amount less than MgO in the base layer and ZnO.

* * * * *